UNITED STATES PATENT OFFICE 2,368,647

LIGHT SENSITIVE PHOTOGRAPHIC MATERIALS

Paul Daniel Dreyfuss, Hollywood, Calif., assignor to Chromogen, Incorporated, a corporation of Nevada No Drawing. Application September 9, 1942, Serial No. 457,755. In Great Britain July 12, 1938

8 Claims. (Cl. 95—8)

This application is a continuation-in-part of my application S. N. 284,102, filed July 12, 1939.

It is already known to fix soluble dyes containing a sulphonic or carboxylic group for photographic purposes by precipitating them with precipitating agents of basic character. As such precipitating agents, it has been proposed to employ, for example, diphenyl guanidine or naphthyl biguanide. Whereas in some cases these compounds are suitable precipitating agents for dyes in silver halide emulsions, they have been found to be deficient in so far as the insoluble precipitates have a remarkable tendency to be dissolved during alkaline after treatment of the exposed layers. Furthermore, the employment of biguanides or dibiguanides to increase the resistance against water or diazotypes has already been described.

It has now been found that the condensation products obtainable from dicyandiamide and aromatic di- or poly-amines are especially useful for fixing soluble acid dyes in light-sensitive silver halide emulsions or in filter layers used adjacent to silver halide emulsions. These reaction products can be prepared by the method described by Cohn in the "Journal für Praktische Chemie," series 2, volume 84, pages 394–409 and are believed to belong to the group of amino-biguanides, dibiguanides or poly-biguanides.

The present invention therefore consists in the employment of the said biguanides, dibiguanides or poly-biguanides derived from aromatic polyamines as precipitating agents for acid dyes or acid dye components in the production of a colored light-sensitive multilayer material comprising at least one silver halide emulsion layer and at least one soluble acid dye in said silver halide emulsion layer or in a non-sensitive layer adjacent thereto—a filter layer, for example.

Compounds suitable for carrying out the process of the present invention are, for example, the biguanides or dibiguanides derived from m-phenylene-diamine, p-phenylenediamine, 1,8-naphthalene diamine, the dibiguanides derived from benzidine, o-tolidine, o-dianisidine, m-dichlorbenzidine, naphthidine, p,p'-diaminodiphenylmethane, p,p'-diamino-diphenyl urea and p-aminobenzylaniline, the tri-biguanides obtained from 1,3,5-triamino benzene and leucorosaniline or the tetra-biguanide obtained from tetra-amino-ditolymethane.

The compounds, which the said biguanides form with a great number of soluble acid dyes used for color photographic purposes, are insoluble in water and in every case the water-solubility of the compound formed from an acid dye and a biguanide derived from an aromatic diamine or polyamine is less than the water-solubility of the compound formed from the same acid dye and the biguanide derived from the corresponding aromatic monoamine. Furthermore, whereas most of the compounds formed from acid dyes and biguanides derived from aromatic monoamines are soluble in the usual alkaline photographic treating baths, most of the compounds formed from acid dyes and the biguanides derived from aromatic diamines or polyamines and, especially those derived from such compounds containing at least two phenyl radicals, are insoluble in and resistant to the usual alkaline photographic treating baths.

The following table shows that the compounds formed from a number of acid dyes with biguanides derived from aromatic monoamines are nearly all soluble in water and alkaline solutions (see Nos. 1–4), whereas the compounds formed from the same acid dyes with biguanides derived from aromatic diamines or polyamines are insol-

| No. | Biguanide derivative of— | Diamine Fast Red F No. 410 | | Congo Red No. 360 | | Benzopurpurine 4B No. 448 | | Oxamine Fast Rose B, p. 164 | | Chloramine Red 3B No. 377 | |
|---|---|---|---|---|---|---|---|---|---|---|---|
| | | a | b | a | b | a | b | a | b | a | b |
| 1 | Aniline | e. so. | e. so. | e. so. | e. so. | s. so. | s. so. | No precipitate | | e. so. | e. so. |
| 2 | α-naphthylamine | s. so. | so. | e. so. | e. so. | s. so. | s. so. | so. | e. so. | so. | so. |
| 3 | β-naphthylamine | ins. | ins. | ins. | s. so. | ins. | a. ins. | | | ins. | s. so. |
| 4 | Phenetidine | s. so. | so. | e. so. | e. so. | s. so. | s. so. | so. | so. | so. | so. |
| 5 | m-Phenylendiamine | ins. | ins. | ins. | so. | ins. | s. so. | | | ins. | so. |
| 6 | p-Phenylendiamine | ins. | ins. | ins. | s. so. | ins. | ins. | s. so. | s. so. | a. ins. | so. |
| 7 | 1,8-naphthylendiamine | ins. | ins. | ins. | s. so. | ins. | ins. | ins. | s. so. | ins. | a. ins. |
| 8 | Benzidine | ins. | ins. | ins. | a. ins. | ins. | ins. | ins. | a. ins. | ins. | a. ins. |
| 9 | Tolidine | ins. | ins. | ins. | ins. | ins. | ins. | ins. | ins. | ins. | ins. |
| 10 | Dianisidine | ins. | ins. | ins. | ins. | ins. | ins. | ins. | ins. | ins. | ins. |
| 11 | p,p'-Diaminodiphenyl-methane | ins. | ins. | ins. | a. ins. | ins. | ins. | ins. | ins. | ins. | a. ins. |
| 12 | m-Dichlorbenzidine | ins. | ins. | ins. | ins. | ins. | ins. | ins. | ins. | ins. | ins. |
| 13 | p,p'-Diaminodiphenyl-urea | ins. | ins. | a. ins. | a. ins. | ins. | ins. | ins. | ins. | ins. | ins. |

ABBREVIATIONS USED.—e. so.=easily soluble; so.=soluble; s. so.=slightly soluble; a. ins.=almost insoluble; ins.=insoluble.
NOTE.—The numbers following the names of the dyes are references to Schultz Farbstofftabellen, 7th ed., vol. II in the case of Nos. preceded by "p," and vol. I in other cases.

uble in water and, in most cases, also insoluble in and resistant to the usual alkaline photographic treating baths (see Nos. 5–13). The first column gives the various bases (mono-amines Nos. 1–4 and diamines Nos. 5–13) from which the biguanides used as preciptants are derived. Columns 2–6 specify the dyes of which the different salts have been tested. Each of the columns 2–6 are subdivided into subcolumns $a$ and $b$, where $a$ denotes the behaviour of the respective salts against water and $b$ denotes the behaviour of the same salt against a 4% sodium carbonate solution.

The results obtained when the precipitants according to the invention are used for precipitating dye components are shown below, the dye component used as an example being aminobenzoyl-aminobenzoyl-H-acid. The precipitates obtained by treating this compound with the dibiguanides of Benzidine,
m-Dichlorobenzidine,
Tolidine,
Diaminodiphenylmethane, are all practically insoluble.

To facilitate their incorporation into the photographic layers or into the solutions and emulsions used in the preparation of such layers, the said amino-biguanides, dibiguanides and polybiguanides are best employed in form of soluble derivatives thereof, such as, for example, the acetates.

In the following examples, some of the biguanides which can be used according to this invention with advantage with soluble acid dye substances or soluble dye compounds which are fast to water and to alkaline developing solutions are set forth.

*Example 1*

4-aminodiphenyl-4'-biguanide of the following formula

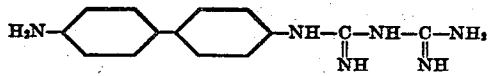

can be used to advantage. This compound was prepared by Georg Cohn, Journal für Praktische Chemie (2) vol. 84, page 406, year 1911 and transformed into its acetate.

*Example 2* p-Dimethylaminobenzyl-(p-tolyl)-biguanide of the following formula

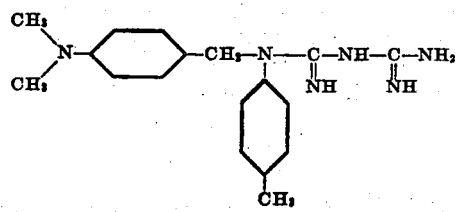

may also be used. The compound can be prepared as follows: 24 grams of dimethylamino-benzyl-toluidine (prepared according to German Patent 108,064; Friedlaender vol. 5, page 86) are dissolved in 100 cc. hydrochloric acid (2n). To the boiling solution are added 9 g. dicyandiamide and after 30' further 2 g. dicyandiamide are added. During the boiling further hydrochloric acid (2n) is added to maintain a Congo acid reaction. After boiling for one hour the solution is allowed to cool. The base is precipitated by addition of NaOH, separated from the mother liquor and washed with water. The semi-solid oily base is dissolved in such a quantity of diluted acetic acid as to give a neutral solution and filtered from undissolved parts. The concentration of biguanide acetate in this solution is determined by the precipitation of a dye solution of known strength.

*Example 3*

(o-Biguanido-m-xylyl)-p-toluylbiguanide hydrochloride of the following formula

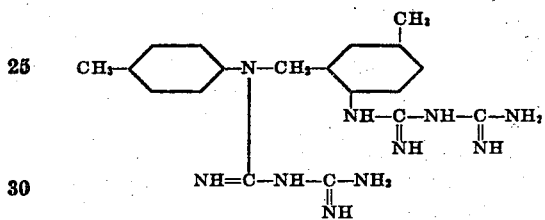

can be used. It may be made by boiling o-amido-m-xylyl-p-toluidine (prepared after German Patent 105,797; Friedlaender vol. 5, page 85) with dicyandiamide in hydrochloric acid solution, and the hydrochloride of the (o-biguanido-m-xylyl)-p-toluylbiguanide crystallizes.

*Example 4*

Diphenyl-dibiguanido-propane is a further illustration of a material to be used according to this invention. It has the formula

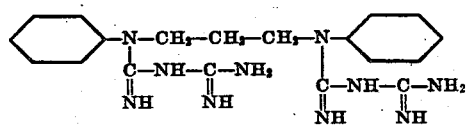

In making it, 4.5 grams diphenyl-trimethylene-diamine (prepared according to M. Scholtz, Berichte der deutschen Chemischen Gesellschaft, vol. 32, page 2252, year 1899) are dissolved in 20 cc. hydrochloric acid (2n). To the boiling solution 5 g. dicyandiamide are added and the boiling continued for two hours. After cooling an excess of a 25% NaOH solution is added. From the strongly alkaline solution the biguanide separates as an oil. It is purified by extraction with n-butylalcohol, separated from the aqueous layer and precipitated by addition of ether. The oil is soluble in water and aqueous acids.

*Example 5* p,p'-Dibiguanido-dibenzyl of the formula

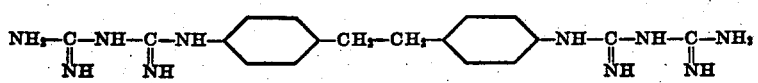

is also useful. In making the compound p,p'-diaminodibenzyl was heated with dicyandiamide in hydrochloric acid solution for four hours. By addition of concentrated hydrochloric acid and cooling, the hydrochloride of the dibiguanide separates in crystalline form. It is filtered off, washed with NaCl solution and dried. It is easily soluble in water.

*Example 6*

3-biguanido carbazol of the probable formula

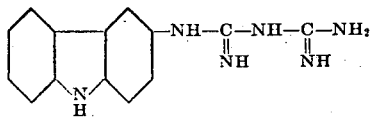

is another substance suitable for use according to the invention. In making it, 9 grams of 3-aminocarbazole are boiled with 9 g. dicyandiamide (2 mol) in 50 cc. hydrochloric acid (2n) for one hour. Further 2 g. dicyandiamide and 50 cc. hydrochloric acid are added and the boiling is continued for another two hours. The solution is evaporated to a small volume. The hydrochloride crystallizes out. It is filtered off and washed with a little ice cold water. The compound dissolved in hydrochloric acid gives by addition of sodium nitrite a yellow precipitate which does not react with azo components. Therefore, the compound is believed to have the indicated constitution.

The above set forth materials form dyestuff precipitates much more fast to water or sodium carbonate solutions than compounds derived from monamines such for example as the simple phenylbiguanide, i. e., the dyes Congo red and Pontamine Fast Blue 6GL precipitate only with an excess of phenylbiguanide and these precipitates are easily soluble in water or in a $Na_2CO_3$ solution of 4% strength. The precipitates of said dyes with the precipitants described in the above examples are insoluble in water and insoluble in $Na_2CO_3$ solution of 4% strength.

Colored photographic materials may be prepared with substances as above described for instance in the following manner:

A. 28 ccs. of a 3% aqueous solution of the dye Tuchechtbrillantrot 2B (Schultz Farbstofftabellen, 7th ed., vol. II, page 221) and 8.5 ccs. of a 10% aqueous solution of 2,2'-dichlor-4,4'-dibiguanido-diphenyl-diacetate are incorporated into 100 ccs. of an ordinary silver halide gelatin emulsion. The whole is thoroughly mixed at 45° C. and the resultant emulsion is used for the red-dyed light-sensitive layer of a multilayer material.

The 2,2'-dichlor-4,4'-dibiguanido-diphenyl-diacetate used in the foregoing example as precipitant for the acid dye is prepared by condensing m-dichlorbenzidine and dicyandiamide in an aqueous medium in presence of hydrochloric acid, treating the precipitate formed with sodium hydroxide solution to obtain the free base and converting the latter into the acetate by treatment with acetic acid.

B. To 15 cc. of silver halide gelatin emulsion are added—
1. A solution of 0.1 gram Diazo Light Yellow (Schultz Farbstofftabellen 7th edition, No. 749) in 8 cc. water.
2. A solution of 0.2 gram diphenyl-dibiguanido-propane (prepared according to Example 4) in 2 cc. water containing 0.06 cc. glacial acetic acid. These two solutions are added to the emulsion at a temperature of 40° C. with all precautions to avoid formation of grains. This emulsion is coated on an area of 1000 square centimeters and thereon an ordinary gelatin layer is coated. After the exposure, development and fixing of the silver image the material is coupled with phenylmethylpyrazolone. A yellow dye is formed in the lower (silver) gelatin layer, the gelatin layer coated thereon remaining colorless.

Layers containing the insoluble compounds according to the invention are especially useful for photographic multilayer materials because, for example, the dye fixed in a filter layer does not diffuse into the adjacent silver halide emulsion layer nor will the dye fixed in a silver halide emulsion layer diffuse into the adjacent light-sensitive or filter layers.

What is claimed is:

1. A light-sensitive photographic multilayer material comprising a plurality of superimposed colloid layers, at least one of said layers comprising a light-sensitive silver halide emulsion, and one of said layers comprising a compound formed with a soluble acid dye substance and a material selected from the group consisting of biguanides having the following general formula:

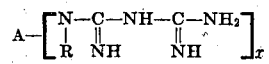

wherein R stands for a substituent selected from the group consisting of hydrogen and hydrocarbon radicals and A stands for a substituent containing at least one basic radical selected from the group consisting of amino, substituted amino, guanidino, substituted guanidino and heterocyclic radicals containing at least one N-atom and $x$ stands for a whole number integer.

2. A light sensitive photographic multilayer material comprising a plurality of superimposed colloid layers, at least one of said layers comprising a light-sensitive silver halide emulsion, and one of said layers comprising a soluble acid dye and a precipitating agent for the dye, said precipitating agent comprising a substance selected from the group consisting of biguanides having the following general formula:

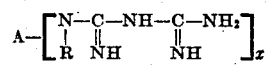

wherein R stands for a substituent selected from the group consisting of hydrogen and hydrocarbon radicals and A stands for a substituent containing at least one basic radical selected from the group consisting of amino, substituted amino, guanidino, substituted guanidino and heterocyclic radicals containing at least one N-atom and $x$ stands for a whole number integer.

3. A light sensitive photographic multilayer material comprising a plurality of superimposed colloid layers, at least one of said layers comprising a light-sensitive silver halide emulsion and one of said layers comprising a soluble acid dye forming substance and a precipitating agent for the dye forming substance, said precipitating agent comprising a substance selected from the group consisting of biguanides having the following general formula:

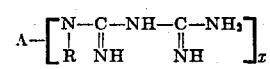

wherein R stands for a substituent selected from the group consisting of hydrogen and hydrocarbon radicals and A stands for a substituent containing at least one basic radical selected from the group consisting of amino, substituted amino, guanidino, substituted guanidino and heterocyclic radicals containing at least one N-atom and $x$ stands for a whole number integer.

4. A light sensitive photographic multilayer material comprising a plurality of superimposed colloid layers, at least one of said layers comprising a light-sensitive silver halide emulsion, and one of said layers comprising a compound formed with a soluble acid dye and a substance having the following general formula:

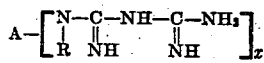

wherein R stands for a substituent selected from the group consisting of hydrogen and hydrocarbon radicals and A stands for a substituent containing at least one basic radical selected from the group consisting of amino, substituted amino, guanidino, and substituted guanidino and heterocyclic radicals containing at least one N-atom and $x$ stands for a whole number integer.

5. A light-sensitive photographic multilayer material comprising a plurality of superimposed colloid layers, at least one of said layers comprising a light-sensitive silver halide emulsion and a compound formed with a soluble acid dye and a substance having the following general formula:

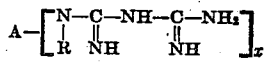

wherein R stands for a substituent selected from the group consisting of hydrogen and hydrocarbon radicals and A stands for a substituent containing at least one basic radical selected from the group consisting of amino, substituted amino, guanidino, substituted guanidino and heterocyclic radicals containing at least one N-atom and $x$ stands for a whole number integer.

6. A light-sensitive photographic multilayer material comprising a plurality of superimposed colloid layers, at least one of said layers comprising a light-sensitive silver halide emulsion, and one of said layers comprising a soluble acid dye and a precipitating agent for the dye, said precipitating agent comprising a substance selected from the group consisting of compounds having the following general formula:

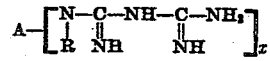

wherein R stands for a substituent selected from the group consisting of hydrogen and hydrocarbon radicals, A stands for an amino substituted diphenyl residue, and $x$ stands for a whole number integer.

7. A light-sensitive photographic multilayer material comprising a plurality of superimposed colloid layers, at least one of said layers comprising a light-sensitive silver halide emulsion, and one of said layers comprising a soluble acid dye and a precipitating agent for the dye, said precipitating agent comprising a substance selected from the group consisting of compounds having the following general formula:

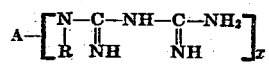

wherein R stands for a substituent selected from the group consisting of hydrogen and hydrocarbon radicals, A stands for an amino substituted benzyl residue, and $x$ stands for a whole number integer.

8. A light-sensitive photographic multilayer material comprising a plurality of superimposed colloid layers, at least one of said layers comprising a light-sensitive silver halide emulsion, and one of said layers comprising a soluble acid dye and a precipitating agent for the dye, said precipitating agent comprising a substance selected from the group consisting of compounds having the following general formula:

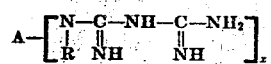

wherein R stands for a substituent selected from the group consisting of hydrogen and hydrocarbon radicals, A stands for an amino substituted diphenyl methane residue, and $x$ stands for a whole number integer.

PAUL DANIEL DREYFUSS.